United States Patent [19]

Terp

[11] Patent Number: 4,903,578
[45] Date of Patent: Feb. 27, 1990

[54] ELECTROPNEUMATIC ROTARY ACTUATOR HAVING PROPORTIONAL FLUID VALVING

[75] Inventor: Leslie S. Terp, Scottsdale, Ariz.

[73] Assignee: Allied-Signal Inc., Phoenix, Ariz.

[21] Appl. No.: 216,753

[22] Filed: Jul. 8, 1988

[51] Int. Cl.[4] .............................................. F01B 3/00
[52] U.S. Cl. ....................................... 91/499; 91/459;
137/625.64; 335/229
[58] Field of Search ................... 417/269; 91/499, 39,
91/192, 459; 137/625.64, 625.26, 596.16;
335/229, 230

[56] References Cited

U.S. PATENT DOCUMENTS

| | | |
|---|---|---|
| 1,933,792 | 11/1933 | Dalton . |
| 2,066,261 | 12/1936 | Finch . |
| 2,137,462 | 11/1938 | Romaine . |
| 2,246,018 | 6/1941 | Snyder . |
| 2,558,184 | 6/1951 | Lavet . |
| 2,617,050 | 11/1952 | Weinfurt . |
| 2,686,893 | 8/1954 | Markson . |
| 2,994,306 | 8/1961 | Livers . |
| 3,023,328 | 2/1962 | Sanford . |
| 3,116,428 | 12/1963 | Blodgett et al. . |
| 3,149,902 | 9/1964 | Dransfield . |
| 3,202,886 | 8/1965 | Kramer . |
| 3,241,006 | 3/1966 | Boyko . |
| 3,437,015 | 4/1969 | Kubilos . |
| 3,573,513 | 8/1968 | Hayosh et al. . |
| 3,661,059 | 5/1972 | Hunter et al. ........................ 91/499 |
| 3,663,122 | 5/1972 | Kitchen . |
| 3,693,033 | 9/1972 | Troesh . |
| 3,753,384 | 8/1973 | Anfindsen . |
| 3,755,699 | 8/1973 | Cartwright . |
| 4,127,835 | 11/1978 | Knutson ........................ 335/229 X |
| 4,217,507 | 8/1980 | Jaffe et al. . |
| 4,301,715 | 11/1981 | Acar ................................ 91/459 X |
| 4,426,911 | 1/1984 | Robinson et al. . |
| 4,513,780 | 4/1985 | Evans ........................... 137/625.64 |
| 4,533,890 | 8/1985 | Patel .............................. 335/229 X |
| 4,616,476 | 10/1986 | Oneyama et al. ................ 91/459 X |
| 4,631,430 | 12/1986 | Aubrecht . |
| 4,647,008 | 3/1987 | Shirai et al. . |
| 4,741,247 | 5/1988 | Glomeau et al. ................ 91/459 X |

FOREIGN PATENT DOCUMENTS 2209347 2/1972 Fed. Rep. of Germany .
PCT/3P85/00313 4/1985 PCT Int'l Appl. .

Primary Examiner—Edward K. Look
Attorney, Agent, or Firm—Terry L. Miller; James W. McFarland; Robert A. Walsh

[57] ABSTRACT

An electropneumatic rotary actuator has proportional fluid valving providing introduction and exhaust of pressurized fluid to and from a working chamber of the actuator. By control of the admission angle and venting angle of the fluid pressure and flow with respect to top dead center and bottom dead center of a working piston of the actuator both the torque level and gas consumption rates of the actuator may be controlled. Further by modulating the average working fluid pressure within the actuator the stiffness or resistance to backdriving of the actuator may be controlled. A proportional linear electrical solenoid is disclosed and employed in the actuator of the present invention to drive a double-acting closed-centered valve device. Because of its lightweight, relatively simplicity, high stiffness to backdriving, and relatively low gas consumption rate, the present actuator is expected to find application in airborne vehicles.

20 Claims, 2 Drawing Sheets

ELECTROPNEUMATIC ROTARY ACTUATOR HAVING PROPORTIONAL FLUID VALVING

TECHNICAL FIELD

The field of the present invention is rotary actuator devices and methods. More particularly, the present invention relates to rotary actuator devices and methods wherein a pressurized elastic fluid is employed as the driving force. The pressurized fluid is used to selectively drive a rotary pressure fluid expanding motor, and the mechanical output of the motor is employed to selectively move and position a load member. Still more particularly, the present invention relates to a rotary pressure fluid expansion motor having a working chamber with respect to which admission and exhaust of expansible pressure fluid is controlled by a valve which is driven by an electro-mechanical proportional solenoid, and to such a solenoid.

BACKGROUND OF THE INVENTION

An electrohydraulic actuator for large aircraft is known in accordance with U.S. Pat. No. 4,426,911, entitled "Rotary Digital Electrohydraulic Actuator" of Curtis W. Robinson and Eugene T. Raymond, assigned to The Boeing Company, and issued Jan. 24, 1984. The actuator according to the '911 patent includes an axial piston hydraulic motor and a speed reduction gear set receiving torque from the motor and communicating this torque to an output shaft. A stepper motor driven commutating valve is provided to control fluid pressure and flow to and from the axial piston hydraulic motor.

An actuator according to the '911 patent offers a high level of torque output in comparison with the size and weight of the actuator, and provides a very high stiffness with respect to unwanted back driving movements of the output shaft by the load member. Unfortunately an actuator according to this patent is not suited for application upon relatively small airborne vehicles because of its weight, complexity, and cost. Also, relatively small airborne vehicles frequently do not have a hydraulic system which would be required in order to power an actuator as taught by the '911 patent.

A pneumatic actuator which is small and lightweight is known in accord with the teaching of U.S. Pat. No. 4,649,803, entitled "Servo System Method and Apparatus, Servo Valve Apparatus Therefore, and Method of Making Same", of Steven G. Abel, assigned to the same assignee as the present application, and issued Mar. 17, 1987. The actuator taught by the '803 patent employs a pair of unequal opposed pistons working on opposite sides of a toggle arm driving an output shaft. The smaller of the two pistons receives pressurized elastic fluid from a source thereof, while the larger of the two pistons receives a modulated pressure via a three-way closed-center solenoid valve.

An actuator according to the '803 patent is small, lightweight, and relatively simple in its construction. Also, this actuator may use pressurized gas from a simple storage vessel, and is well suited for use aboard small airborne vehicles. However, an actuator according to this teaching has a relatively limited output torque and limited stiffness with respect to undesirable back driving movements or oscillations of the load member. Also, this actuator may experience an undesirably high consumption of pressurized fluid when designed with a view to providing the stiffness needed by some airborne vehicles.

Yet another fluid valve actuator is known in accord with U.S. Pat. No. 4,533,890, entitled "Permanent Magnet Bistable Solenoid Actuator", of Balkrishna R. Pattell, assigned to General Motors Corporation of Detroit, Mich., and issued Aug. 6, 1985. The bistable solenoid actuator according to the '890 patent includes a pair of spaced apart opposed cup-like coil members receiving therebetween an annular armature which is movable between first and second bistable positions adjacent to either one of the two coil members. The armature includes a pair of oppositely disposed annular magnets and magnetically permeable material providing a flux path through the magnets. The pair of spaced apart coil members receiving the magnetic armature member therebetween are arranged so that they may simultaneously provide a repulsive force from one of the coil members and an attractive force toward the other of the coil members. Thus, the armature member is driven from the one bistable position towards the other position in response to an input command.

The bistable solenoid valve actuator taught by the '890 patent is in no respect proportional in its actions. This device is fast acting, and has essentially a step function output expressed as the position of a driven member connected with the armature.

Finally, a linear force motor is known in accord with the teaching of U.S. Pat. No. 4,631,430, of Richard A. Aubrecht, assigned to Mooge Incorporated of East Aurara, N.Y., and issued Dec. 23, 1986. The linear force motor in accord with the '430 patent includes a body defining an annular chamber receiving an armature, the body and the armature cooperating to define four axially spaced active air gaps across which magnetic flux originating with a pair of permanent magnets is conducted. The permanent magnet flux may be moderated by control flux from a pair of electromagnet coils arranged upon the body. The control flux from the electromagnets when superimposed upon the flux from the permanent magnets creates a net flux imbalance which urges the armature to move in a desired direction relative to the body. While this linear force motor of the '430 patent does provide a output of linear movement in accord with the current flow in the electromagnetic coils thereof, the armature itself is of such a nature that its connection to the valve member of a valve device is not easily accomplished.

SUMMARY OF THE INVENTION

In view of the above, it is desirable to provide a small, lightweight and inexpensive actuator for use aboard airborne vehicles, which actuator provides a stiffness against back driving exceeding that obtainable in an actuator of comparable size and weight by use of the teaching of the '803 patent, and favorably comparing with the back driving stiffness provided by the teaching of the '911 patent. However, the actuator should not require the lubricity of hydraulic fluid, and should be operable with unlubricated gas stored under pressure. Also, this inventive actuator should be smaller, lighter in weight, and less expensive than the actuator taught by the '911 patent. It is desirable also to utilize modern electronics to a high degree in the control of such an actuator. Also, new high energy permanent magnet materials should be used to best advantage. Fluid pressure and flow to and from the actuator desirably should be controlled by an electrically actuated solenoid valve which is relatively simple and rugged in its construction. The solenoid should have a output as taught by the '890 patent, and should be proportional as well. A proportional solenoid valve is desirable in order to tailor or adapt the torque output and resulting gas consumption rate of the actuator with the demands of a flight control surface upon an airborne vehicle at any particular time. Therefore a linear electromechanical valve actuator like that actuator taught by the '430 patent does not provide a convenient interfacing of the movable armature of the actuator with a valve member of a valve device.

Accordingly it is an object of the present invention to provide an electropneumatic rotary actuator having proportional fluid valving and which actuator is relatively small and light-taught weight while affording a very high stiffness at the output shaft to resist undesirable movements and vibrations of the output member. More particularly this actuator is anticipated for use in airborne vehicles wherein the load member of the actuator will be a flight control surface of the vehicle. As such, this flight control surface may be subject to vibration, oscillation, and unwanted random movements which must be resisted by the actuator of this invention. At the same time the flight control surface must be moved and positioned according to command inputs to the actuator while utilizing a minimum volume of pressurized expansible fluid.

Further to the above, this invention provides an actuator having a housing defining three parallel bores opening to a chamber. A rotatable shaft is journalled by the housing and also extends into the chamber to there define a crank pin angularly disposed with respect to the rotational axis of the shaft and the axis of the parallel bores. A wobble plate is relatively rotatably carried upon the crank pin of the shaft and is prevented from rotation relative to the housing by a gymbal member pivotally carried within the housing. Three piston members are sealingly and reciprocably received each in a respective one of the three parallel bores of the housing. These piston members are joined with the wobble plate at respective ball-and-socket joints. The shaft is geared with an output shaft via a double enveloping worm and sector gearing. Each of the three parallel bores is closed at its end opposite the wobble plate by a respective one of three closed-centered three-way proportional solenoid valves. A single input port communicates with each one of the three solenoid valves and provides flow thereto of pressurized fluid from a source thereof. The proportional solenoid valves are effective to communicate pressurized fluid from the source to each one of the bores individually and to vent fluid therefrom in accord with an individual electrical command input to each the respective solenoid valves. The shaft is interfaced at its end opposite the wobble plate with a commutation device, and the solenoid valves receive their command inputs from an electronic controller interfacing with the commutation device.

Further to the above, the proportional solenoid valves of the present invention each comprise a housing of magnetically permeable material receiving therein a two-way closed-centered valve apparatus movable in opposite directions from a closed position to either of a first position wherein pressurized fluid is communicated from the source thereof into the variable-volume chamber formed within the bore of the housing, and a second position wherein the variable-volume chamber is communicated with ambient. Movement of the valve from its closed-centered position to either one of the first and second positions is effected by corresponding movements of an armature member reciprocably received within the housing and operatively engaging a portion of the valve apparatus. The armature member is generally annular and is fabricated of magnetically permeable material. An annular permanent magnet circumscribes a portion of the armature and cooperates with a magnetically permeable flux conductor to introduce static flux into the armature immediate of the ends thereof. The armature member cooperates with the housing to define a pair of active axially disposed air gaps at the opposite ends of the annular armature member.

Also circumscribing the armature member and the permanent magnet is an electromagnetic coil which is effective to produce a control flux within the armature and housing. The control flux is effective across the pair of axially disposed air gaps to superimpose upon the static flux created in these air gaps by the permanent magnet. Depending upon the sense of the control flux the attractive force between the annular armature member and the housing at one of the active air gaps is strengthened while the attractive force at the opposite end of the armature member is weakened. The result is a net axial force in the direction of the one active air gap.

The armature member is biased to a centered position by opposed coil compression springs, and is moved away from this centered position in accord with the change in net flux at the active air gaps as described above. By matching the area and flux density at the active air gaps with the spring rate and preload of the centering springs, the linear valve actuator provides an output force proportional with the current flow in the solenoid winding. Consequently, the opening of the valve device in either one of its two senses to provide flow into or out of the working chamber of the actuator motor may be controlled proportionally according to the electrical input to the solenoid coil.

Advantageously, this proportional control described above allows modulation of the fluid inflow and outflow durations in view of the positions of the pistons relative to the extremes of their strokes, and the rotational speed and torque required of the actuator. That is, the period during which admission of expansible pressurized fluid to the working chamber of the actuator is permitted may be varied depending upon the torque required of the actuator and its rotational speed. Similarly, the venting of pressurized fluid from the working chambers of the actuator may be controlled to effect a variable average fluid pressure therein, with the result that a desired level of stiffness, or resistance to back driving of the actuator, may be selected.

An additional advantage of the proportional valving of the present actuator is that the high frequency opening and closing of conventional solenoid valves of the pulse width duration modulated (PDM) type is completely eliminated by the present solenoid valve. That is, previous solenoid valves which are capable of modulating a fluid pressure through pulse width duration modulation of their opening and closing actions are subject to a high degree of wear and a limited useful life of the valve members as a result of this high frequency of opening and closing. Such high frequency opening and closing and accelerated wear is completely eliminated by the present proportional solenoid valve.

BEST MODE FOR CARRYING OUT THE INVENTION

Figure 1:
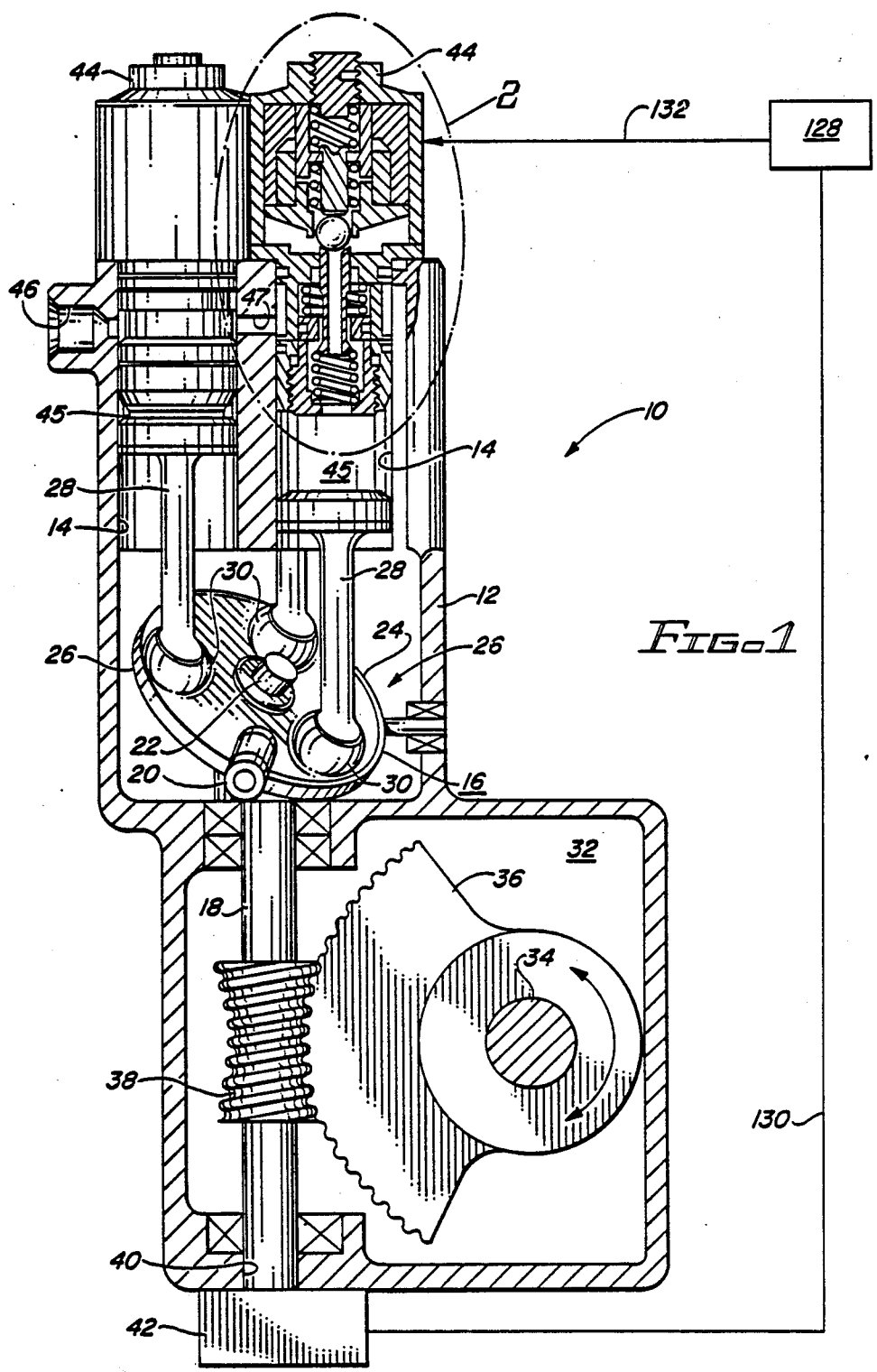
FIG. 1 depicts somewhat schematically, and partially in cross-sectional view, an electropneumatic rotary actuator having proportion fluid valving and embodying the present invention.
Figure 2:
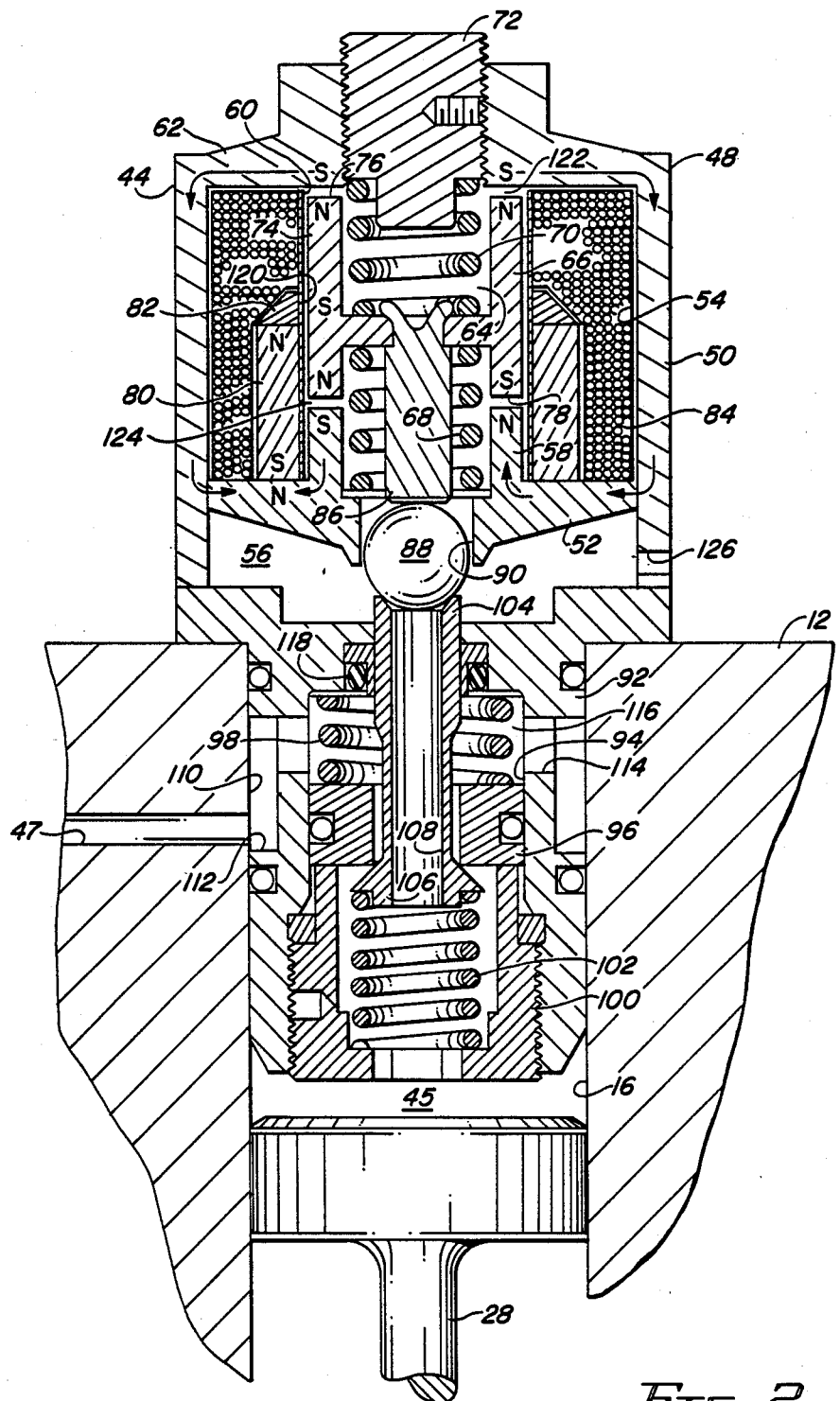
FIG. 2 depicts an enlarged fragmentary view of an encircled portion of FIG. 1.

Viewing FIGS. 1 and 2 in conjunction it will be seen that an electropneumatic rotary actuator (10) includes a housing (12) which defines three elongate parallel bores generally referenced with the numeral (14), only two of which are visible in FIG. 1, and each opening outwardly on the housing (12), and also into a chamber (16). The housing (12) also journals a shaft (18) extending into the chamber (16). This shaft (18) at its upper end defines a crank portion (20) including an angulated crank pin (22). Relatively rotatably carried upon the crank pin (22) of the shaft (18) is a wobble plate or wobble disk (24). A gymbal member (26) pivotally connects with the wobble plate (24) and is pivotally connected with the housing (12) to prevent rotation of the wobble plate (24) relative to the housing. Three piston members (28) are respectively received reciprocably and sealingly in the bores (14). Each one of the piston members (28) connects with the wobble plate (24) via a ball-and-socket type of joint, each generally referenced with the numeral (30). Preferably, the joints (30) are of the ball bearing anti-friction type to minimize the lubrication requirements of the actuator (10).

Further viewing the actuator (10), it will be seen that shaft (18) extends into a second chamber (32) wherein is disposed a rotatable output shaft (34). The shaft (34) carries a sector gear (36) meshing with a worm gear (38) drivingly carried upon the shaft (18). The worm gear (38) and the sector gear (36) are of the double-enveloping type to result in a high efficiency of torque transmission between the shaft (18) and the shaft (34), while also providing a large speed reduction between these two shafts. The shaft (18) also extends through a bore (40) defined by the housing (12) and drivingly connects with an electrical commutation device generally referred to with the numeral (42).

At their respective ends opposite the wobble plate (24) and chamber (16) each one of the bores (14) is closed by a respective one of a plurality of proportional solenoid valve devices (44). The solenoid valves (44) cooperate with the housing (12) and piston members (28) to define three variable-volume chambers, generally referenced with the numeral (45), within the bores (14). In order to complete this description of the apparatus depicted by FIG. 1, it must be noted that the housing (12) also defines an inlet port (46) and flow path (47) whereby pressurized fluid from a source thereof may be received by the actuator (10).

Viewing now more particularly FIG. 2, it will be seen that the solenoid valve (44) includes a housing (48) which, in part, is generally cup-shaped and formed of magnetically permeable material. The housing (48) includes a circumferentially extending side wall (50) and a transverse wall portion (52) cooperating with the remainder of the housing to define a pair of chambers (54) and (56) therewithin. The wall portion (52) defines an annular axially extending pole piece portion (58). Disposed about the pole piece portion (58) is an elongate annular nonmagnetic but magnetically permeable guide member (60). The guide member (60) extends from the wall portion (52) axially to an end wall portion (62) of the housing (52). Consequently, the pole piece portion (58) and the guide member (60) cooperate with the remainder of the housing (52) to define an axially elongate subchamber (64) within which is reciprocably received an annular armature member (66).

The armature member (66) is yieldably biased to a centered position, as depicted, by two oppositely disposed-coil compression springs (68) (70). The spring (68) extends between the transverse wall portion (54) and the armature member (66) to bias the latter upwardly viewing FIG. 2. On the other hand, the spring (70) extends between the armature member (66) and a spring seat member (72) which threadably engages the housing (52) at end wall portion (62) thereof. The member (72) is exposed externally of housing (48) and provides means for axially adjusting the centered position of the armature member (66). Further, viewing the armature member (66), it will be seen that the latter defines a radially outwardly disposed side surface (74), and a pair of axially oppositely disposed annular end surfaces (76), and (78).

Circumscribing the guide member (60) is an axially elongate and axially polarized annular permanent magnet member (80) having north and south magnetic poles, as denoted upon FIG. 2 by the symbols N and S. Preferably, the permanent magnet member (80) is of high-energy material. For example, the permanent magnet (80) may be made of Samariam Cobalt permanent magnet material. The magnet member (80) at its south magnetic pole engages the transverse wall portion (52). Immediately adjacent the upper magnet pole, (the north magnetic pole, viewing FIG. 2) is an annular flux conductor member (82), which importantly is disposed intermediate of the axial ends of the armature member (66). Further, circumscribing the permanent magnet member (80) the flux conductor (82), and the guide member (60) within chamber (54) is an electrical winding, or coil, generally referenced with the numeral (84). Electrical leads (not shown) extend outwardly from the electrical winding (84) through the housing (48). The armature member (66) carries an axially elongate push rod member (86) extending downwardly from the armature member to a spherical valve member (88), which is movably disposed within a bore (90) defined by the transverse wall portion (52).

An elongate valve housing portion (92) of the solenoid valve (44) is sealingly received within the bore (16) of the actuator housing (12), and cooperates with the latter and with the piston (28) to define the variable-volume chamber (46). The valve portion (92) of the housing defines a stepped elongate bore (94) wherein is movably and sealingly received an annular valve seat member (96). A coil compression spring (98) extends between the housing portion (92) and the annular valve seat portion (96) to bias the latter downwardly, viewing FIG. 2. In opposition to the bias provided by the coil compression spring (98), the housing (92) threadably receives an annular adjusting member (100). The member (100) also serves as a spring seat for a coil compression spring (102) extending therefrom upwardly to a movable tubular poppet valve member (104). The poppet valve member (104) at a head portion (106) thereof valvingly engages the annular valve seat member (96) and defines a through passage (108) extending upward to the chamber (56) and ball valve (88).

As will be noted, the spherical ball valve member (88) valvingly engages the upper end of the elongate poppet valve member (104) to prevent flow therethrough from chamber (45). Finally, it will be noted that the flow path (47) communicates with an annular chamber (110) defined by a circumferential groove (112) on the valve portion (92) of the valve (44). The chamber (110) communicates via a radial passage (114) with a chamber (116) circumscribing the elongate poppet valve member (104) intermediate of its sealing engagement with the annular valve seat member (96) and a seal member (118) carried by the housing portion (92).

Observing FIG. 2 in greater detail, it will be seen that the static flux provided by magnet (80) within the magnetically permeable material of the housing (48) and armature member (66) is depicted on the left side of this drawing figure. It will be seen that from the north pole of the permanent magnet member (80) and flux conductor (82), the flux flow enters armature member (66) at side surface (74) intermediate of the axial end surfaces (76), (78), and at a radially extending static air gap (120). This flux flow has two alternative flow paths available to it. The first flux path extends upwardly within armature member (66), crosses an upper active air gap generally referenced with the numeral (122), defined at end wall (62) and end surface (76), and thence downwardly in the side wall (50) of the housing member (48), to return to the south magnetic pole of the permanent magnetic member (80) via the transverse wall portion (52). Alternatively, the flux entering armature member (66) may travel downwardly across a second active air gap generally referenced with the numeral (124), defined at pole piece portion (58), and subsequently downwardly within the pole piece portion (58) to the transverse wall portion (52).

Also, a control flux may be induced in the magnetically permeable material of the armature member (66) and the housing (48) by current flow within the electrical solenoid coil (84). By way of example, this magnetic circuit is depicted on the right side of FIG. 2, and is represented as a flux circulation upwardly through the armature member (66), across the air gap (122), through end wall portion (62), and downwardly in the side wall (50) of the housing (48), to enter the transverse wall portion (52), and across the second active air gap (124). It will be seen in this example that the control flux resulting from current flow in the solenoid coil (84) is superimposed upon the static flux originating with the permanent magnet (80). Dependent upon the direction of current flow in the solenoid coil (84), this control flux will increase the net flux flow across one of the air gaps (122), (124), while weakening the flux flow across the other of these two air gaps. As depicted on FIG. 2 the control flux is adding to the flux flow in air gap (122) while decreasing the flux flow at air gap (124).

In view of the above, it is easily seen according to the above example that the armature member (66) is urged upward in opposition to the centering bias provided by coil springs (68) (70). Via the push rod member (86), the valve member (88) is thus allowed to unseat from its sealing engagement with the upper end of the elongate tubular poppet valve member (104). As a consequence of this unseating of the valve member (88), pressure fluid is vented from the chamber (45) via the through passage (108) of the tubular poppet valve member (104), and into the chamber (56). From the chamber (56), fluid is vented via a vent passage (126) defined by the housing (48).

Alternatively, energizing of the solenoid coil (84) in an opposite sense strengthens the flux across air gap (124) while simultaneously weakening the flux across the air gap (122). In this event, the push rod member (86) conveys a downwardly directed force upon the valve member (88) which is transmitted thereby to the elongate poppet valve member (104). The poppet valve member (104) is consequently unseated at its head portion (106) from its sealing engagement with the annular valve seat member (96), and communicates the chamber (110) with the chamber (45) to allow flow of pressurized fluid thereto from the flow path (47).

Having observed the structure of the electropneumatic rotary actuator according to the present invention, attention may now be directed to its operation. Viewing once again FIG. 1, it will be seen that pressurized fluid is communicated to the inlet port (46) of the actuator and is distributed to the chambers (110) adjacent to each one of the solenoid valves (44) by the flow path (47). At any particular time, the rotational position of the shaft (18) is sensed by the commutator device (42). Consequently, the position of each one of the piston members (28) in its respective bore (14) is known. An electronic controller (128) receives a positional signal input from the commutation device (42) via a conductor (130), and communicates sequential command signals to the respective solenoid valves (44) of the actuator (10) via a command connection (132). The command connection (132) provides sequential electrical input signals of appropriate timing and polarity to the solenoid coil (84) of the individual solenoid valves (44) as is further explained hereinafter.

The timing of each of fluid admission and fluid venting from each of the respective variable-volume chambers (46) of the actuator (10) is sequentially controlled by the electronic control device (128) to result in reciprocation of the piston members (28) in the bores (14) and mutation of the wobble plate member (24). This mutation of the wobble plate member (24) is converted to rotary motion of the shaft (18) because of the constraint to rotation placed upon the wobble plate member (24) by the gymbal (26) and the relatively rotational relationship of the wobble plate upon the crank pin (22) of the shaft (18). Rotary motion of the shaft (18) results in rotary motion of the output shaft (34) at a greatly reduced speed because of the intermeshing of the worm gear (38) with the segment gear (36). It must be noted that the worm gear (38) and segment (36) provide a high efficiency of torque transmission from the shaft (18) to the shaft (34) while simultaneously providing a large speed reduction. On the other hand, torque transmission from the shaft (34) to the shaft (18) is opposed both by the high gear ratio and the significantly lower efficiency of torque transmission from the output shaft (34) to the shaft (18).

Further to the above, viewing once again FIG. 2, it is important to note that admission of pressurized fluid from the flow path (47) into the variable volume chambers (45), and exhausting of fluid from these chambers via the chamber (56) and vent port (126) is accomplished in each case by a single opening and closing movement of the associated valve members (88), (104). That is, the present rotary actuator does not require the relatively high frequency opening and closing movements of previous actuators which employ pulse duration modulation (PDM). Further to the above, the present actuator may, by control of the time interval, or admission angle relative to top dead center position of each piston (28) during which pressurized fluid is admitted to each one of the variable-volume chambers (45), control both the torque output level of the actuator (10) and its rate of consumption of pressurized fluid. Of course fluid consumption increases with increasing admission angle and torque output. Also, the present actuator may be made to exhibit a variable stiffness with respect to backdriving of the actuator by the load member attached to the output shaft (34). That is, if the average pressure within the variable-volume chambers (45) is maintained at a comparatively higher level, the stiffness of the actuator is commensurately increased as compared to the stiffness exhibited if a comparatively lower average pressure is employed in the chambers (45). Thus, it will be appreciated that both the torque output and resistance to backdriving of the present actuator may be matched to the requirements of the load member driven thereby, both of these factors involving a trade off in gas consumption rate of the actuator.

While the present invention has been depicted, described, and defined by reference to one particularly preferred embodiment thereof, such reference does not imply a limitation upon the invention, and no such limitation is to be inferred. The invention is intended to be limited only by the spirit and scope of the appended claims which provide additional definition of the invention.

What is claimed is:

1. Rotary actuator apparatus comprising:
   a housing defining a plurality of elongate bores, and journaling a rotational shaft therein:
   a like plurality of piston members sealingly and reciprocably received individually each in a respective one of said plurality of bores, and cooperating with said housing to define a like plurality of variable-volume chambers;
   motion conversion means interconnecting said shaft and said plurality of piston members for producing sequential reciprocation of the latter, and rotation of said shaft in response to said reciprocation:
   an output shaft pivotally carried by said housing;
   rotary speed reduction means coupling said shaft with said output shaft for pivoting the latter at a reduced speed with a determined torque transmission efficiency in response to rotation of said shaft, and in the opposite direction (back driving) having a certain torque transmission efficiency less than said determined efficiency: and
   a like plurality of closed-center three-way solenoid valve means each for communicating a source of pressure fluid with a respective one of said variable-volume chambers, and for alternatively venting said respective chamber to ambient.

2. The invention of claim 1 wherein said plurality of elongate bores each open outwardly upon said housing, said like plurality of closed-center three-way solenoid valve means being sealingly received individually at the outward opening of respective ones of said plurality of bores, said solenoid valve means cooperating with said housing and like plurality of piston members to define said plurality of variable-volume chambers.

3. The invention of claim 2 wherein said housing defines an inlet port for communicating pressurized fluid with each one of said plurality of bores, each one of said plurality of solenoid valve means including a valve portion sealingly received within said respective bore, and said valve portion defining a cavity sealingly separate both from ambient and the respective variable-volume chamber and communicating with said inlet port.

4. The invention of claim 3 wherein each one of said plurality of solenoid valve means also includes a solenoid portion disposed outwardly of said bore.

5. The invention of claim 4 wherein said solenoid portion includes an axially elongate armature member defining a side surface and a pair of oppositely disposed axial end surfaces, a magnetically permeable housing defining an axially extending elongate cavity reciprocably receiving said armature member and defining two opposite axially disposed spaced apart pole faces cooperating with said pair of end faces of said armature member to define a respective pair of axially extending annular active magnetic air gaps, an elongate axially polarized annular permanent magnet member circumscribing said armature member and at one pole of said magnet engaging said housing, an annular flux conductor member engaging the other pole of said permanent magnet member and being disposed intermediate the end surfaces of said armature member and adjacent said side surface thereof to define a radially extending inactive magnetic air gap: said permanent magnet providing a static flux at said static air gap and at each of said pair of active air gaps, the latter of which provide a first balanced magnetic force to urge said armature member in opposite axial directions, resilient means for yieldably urging said armature member to a centered position wherein the latter is equidistant from each of said pair of pole faces: and an electromagnetic coil circumscribing said armature, said permanent magnet member, and said flux conductor for inducing at said pair of axial air gaps a selectively reversible control flux dependent upon electrical polarity applied to said coil: and which control flux is superimposed upon said static flux to, on the one hand increase the total flux at one of said pair of active air gaps while, on the other hand decreasing the total flux at the other of said pair of active air gaps, thereby providing a second magnetic force to urge said armature member in a selected axial direction.

6. The invention of claim 5 wherein said resilient means provides a spring rate opposing movement of said armature member away from said centered position, which spring rate is matched with said second magnetic force, thereby to provide a force versus coil current proportional solenoid.

7. The invention of claim 5 wherein said valve portion includes an annular seat member defining a flow path communicating said cavity with said variable-volume chamber, a tubular pressure-balanced poppet valve member movably received in said seat member and having a head portion adjacent said variable-volume chamber, said poppet valve member sealingly engaging said seat member to close communication between said cavity and said variable-volume chamber, said poppet valve member defining a second flow path communicating said variable-volume chamber with ambient, a second valve member sealingly engaging said tubular poppet valve member to close said second flow path, and force transmitting means extending between said armature member and said second valve member for, on the one hand moving the latter and said poppet valve member to communicate said cavity with said variable-volume chamber and, on the other hand unseating said second valve member to vent to said variable-volume chamber to ambient, respectively in response to opposite axial movements of said armature member from said centered position dependent upon the electrical polarity applied to said coil.

8. The invention of claim 1 wherein said motion conversion means includes said shaft drivingly carrying a crank portion having an angulated crank pin, a wobble plate member relatively rotatively received upon said crank pin, omnidirectional joint means connecting each of said plurality of piston members with said wobble plate member, at respective circumferentially spaced locations thereon, and means for preventing rotation of said wobble plate member relative to said housing while permitting nutation thereof in response to rotation of said shaft.

9. The invention of claim 4 wherein said rotary speed reduction means comprises a worm gear drivingly carried by said shaft, and a sector gear drivingly carried by said output shaft and meshing with said worm gear.

10. The invention of claim 1 further including commutation means drivingly connecting with said shaft and providing an output signal indicative of relative rotational position thereof, and command means receiving said output signal and providing sequential command signals to said plurality of solenoid valve means for sequentially communicating and venting pressurized fluid to and from said plurality of variable-volume chambers.

11. Double acting electric solenoid apparatus comprising:
   a generally cup-shaped housing of magnetically permeable material having a side wall, an end wall, and a transverse wall spaced from said end wall and cooperating therewith and with said side wall to define an elongate axially extending chamber within said housing, one of said transverse wall and said end wall defining an annular pole piece portion extending axially toward the other of said transverse wall and end wall,
   an axially elongate annular armature member of magnetically permeable material movably received in said chamber, said armature member defining a side surface and a pair of oppositely axially disposed end surfaces and in a first centered position thereof being substantially equally spaced both from said pole piece and from the other of said transverse wall and end wall thereby to define at said pair of end surfaces a respective pair of axially extending annular active magnetic air gaps expanding and contracting in opposition in response to axial movement of said armature member:
   resilient means yieldably urging said armature member to said first centered position;
   an elongate annular axially polarized permanent magnet member circumscribing said pole piece, and at one pole thereof in magnetic contract with the one of said transverse wall and end wall:
   an annular magnetically permeable flux conductor member in magnetic contact with the other pole of said permanent magnet member, said flux conductor member further being disposed in radially spaced relation adjacent said side surface of said armature member intermediate said end surfaces thereof to define a radially extending annular inactive magnetic air gap, one of said pair of active magnetic air gaps further being disposed axially intermediate of the poles of said permanent magnet member, whereby said permanent magnet provides static flux in said pair of air gaps and balanced magnetic forces urging said armature in opposite axial directions from said centered position:
   coil means disposed in said chamber and circumscribing said armature member, said permanent magnet member, and said flux conductor member for providing a control flux superimposed at said pair of active air gaps upon said static flux to selectively increase the magnetic force at one of said pair of air gaps while simultaneously decreasing said force at the other of said air gaps, thereby moving said armature from said centered position selectively to one of opposite second and third positions dependent upon electrical polarity applied to said coil means.

12. The invention of claim 11 wherein said resilient means includes a first coil compression spring extending from said transverse wall to said armature member, a spring seat member axially adjustably engaging said end wall, and a second coil compression spring extending from said spring seat member to said armature member in opposition to said first spring.

13. The invention of claim 12 wherein said spring seat member threadably engages said end of wall.

14. The invention of claim 11 wherein said transverse wall defines a centrally disposed opening, said armature member operatively engaging a push rod member extending axially outwardly of said chamber toward said opening.

15. Double acting electric solenoid apparatus comprising:
   a generally cup-shaped housing of magnetically permeable material having a side wall, an end wall, and a transverse wall spaced from said end wall and cooperating therewith and with said side wall to define an elongate axially extending chamber within said housing, one of said transverse wall and said end wall defining an annular axially pole piece portion extending axially toward the other of said transverse wall and end wall,
   an axially elongate annular armature member of magnetically permeable material movably received in said chamber said armature member defining a side surface and a pair of oppositely axially disposed end surfaces, thereby to define at said end surfaces a pair of axially extending annular active magnetic air gaps expanding and contracting in opposition in response to axial movement of said armature member; an elongate annular axially polarized permanent magnet member circumscribing said pole piece, and at one pole thereof in magnetic contact with the one of said transverse wall and end wall:
   an annular magnetically permeable flux conductor member in magnetic contact with the other pole of said permanent magnet member, said flux conductor member further being disposed in radially spaced relation adjacent said side surface of said armature member intermediate said end surfaces thereof to define a radially extending annular inactive magnetic air gap, one of said pair of active magnetic air gaps further being disposed axially intermediate of the poles of said permanent magnet member, whereby said permanent magnet provides static flux in said pair of air gaps and balanced magnetic forces urging said armature in opposite axial directions from said centered position;
   coil means disposed in said chamber and circumscribing said armature member, said permanent magnet member, and said flux conductor member for providing a control flux superimposed at said pair of air gaps upon said static flux to selectively increase the magnetic force at one of said pair of air gaps while simultaneously decreasing said force at the other of said air gaps thereby moving said armature from said centered position selectively to one of opposite second and third positions dependent upon electrical polarity applied to said coil means.

16. The method of pivotally moving a load member comprising the steps of:
providing a housing;
defining a plurality of elongate bores opening outwardly upon said housing:
disposing a like plurality of piston members sealingly and reciprocably each in a respective one of said plurality of bores:
closing said outward opening of said plurality of bores with a like plurality of closed-centered three-way solenoid valves each sealingly received in a respective one of said plurality of bores:
rotatably journaling a shaft within said housing;
interconnecting said shaft and said plurality of piston members with rotary motion conversion means for sequentially reciprocating the latter in response to shaft rotation, and rotating said shaft in response to said reciprocation:
defining a like plurality of variable-volume chambers within said bores by the cooperation of said housing, solenoid valves and piston members, which chambers sequentially expand and contract in response to said reciprocation of said piston members:
sequentially communicating to and venting from said plurality of variable-volume chambers a flow of pressurized elastic fluid from a source thereof via said like plurality of solenoid valves:
reciprocating said plurality of piston members sequentially in response to said flow of pressurized fluid:
rotating said shaft in response to said sequential reciprocation of said plurality of piston members; and
pivoting said load member at a relatively reduced speed in response to rotation of said shaft.

17. The method of claim 16 wherein said step of pivoting said load member in response to rotation of said shaft includes the additional step of coupling said shaft with said load member via a speed reduction gear set having a significantly higher efficiency of torque transmission from said shaft to said load member than in the opposite direction.

18. The method of claim 17 further including the steps of drivingly coupling a worm gear on said shaft, meshing a sector gear with said worm gear for pivotal movement at a reduced speed in response to rotation of said shaft, and drivingly coupling said load member with said sector gear for pivoting in unison therewith.

19. Rotary servo motor apparatus of the elastic fluid expanding type comprising: a housing defining a plurality of bores opening outwardly thereon; a like plurality of piston members sealingly and reciprocably received each in a respective one of said bores; a shaft member rotatably journaled by said housing: motion conversion means for sequentially reciprocating each one of said plurality of piston members in response to rotation of said shaft and rotating said shaft in response to sequential reciprocation of said piston members: a like plurality of closed-centered three-way solenoid valves respectively received each in a respective one of said plurality of bores to sealingly close said outward opening thereof, and cooperating with said housing and piston members to define a like plurality of variable-volume chambers expanding and contracting sequentially, and command means for controlling said plurality of solenoid valves to sequentially introduce to and vent from said plurality of variable-volume chambers a flow of pressurized elastic fluid.

20. Linear force motor apparatus comprising: an axially elongate annular magnetically permeable armature member having a radially outer side surface and a pair of opposite axially disposed annular end surfaces: a cup-like housing member of magnetically permeable material defining a chamber reciprocably receiving said armature member and having an end wall, a transverse wall spaced from said end wall, and a circumferentially extending side wall extending between and interconnecting said end wall and transverse wall, said end wall and said transverse wall sandwiching said armature member therebetween and cooperating therewith to define a pair of axially extending annular active air gaps expanding and contracting in opposition in response to axial reciprocation of said armature member: an axially polarized and elongate annular permanent magnet member circumscribing said armature member; means for introducing static flux from said permanent magnet member into one of said end wall and transverse wall and into said armature member side wall via a radially extending inactive air gap defined thereby intermediate of said end surfaces, thereby to create a pair of oppositely extending flux loop paths each including only one of said pair of active air gaps: and coil means within said housing and circumscribing said armature member, said permanent magnet, and said flux introducing means for selectively inducing a control flux of alternatively opposite polarity in said housing and armature and superimposed upon said static flux to, on the one hand increase the net flux at one of said pair of active air gaps and, on the other hand to decrease the net flux at the other of said pair of air gaps, whereby said armature member is subject to a linear axial magnetic force dependent upon the polarity of said control flux.

* * * * *